US012646504B2

(12) United States Patent
Muller et al.

(10) Patent No.: US 12,646,504 B2
(45) Date of Patent: Jun. 2, 2026

(54) NEURAL MODULATION CODES FOR MULTILINGUAL AND STYLE DEPENDENT SPEECH AND LANGUAGE PROCESSING

(71) Applicant: Zoom Video Communications, Inc., San Jose, CA (US)

(72) Inventors: Markus Muller, Einkenheim-Hochstetten (DE); Alexander Waibel, Sammamish, WA (US); Sebastian Stüker, Karlsruhe (DE)

(73) Assignee: Zoom Communications, Inc., San Jose, CA (US)

( * ) Notice: Subject to any disclaimer, the term of this patent is extended or adjusted under 35 U.S.C. 154(b) by 384 days.

(21) Appl. No.: 17/312,496

(22) PCT Filed: Jun. 7, 2019

(86) PCT No.: PCT/US2019/036029
§ 371 (c)(1),
(2) Date: Jun. 10, 2021

(87) PCT Pub. No.: WO2020/122985
PCT Pub. Date: Jun. 18, 2020

(65) Prior Publication Data
US 2022/0059083 A1 Feb. 24, 2022

Related U.S. Application Data

(60) Provisional application No. 62/777,340, filed on Dec. 10, 2018.

(51) Int. Cl.
*G10L 15/16* (2006.01)
*G10L 15/00* (2013.01)
*G10L 15/06* (2013.01)

(52) U.S. Cl.
CPC ............ *G10L 15/16* (2013.01); *G10L 15/005* (2013.01); *G10L 15/063* (2013.01)

(58) Field of Classification Search
CPC ..... G10L 15/16; G10L 15/005; G10L 15/063; G10L 25/90; G06F 3/011; G06F 3/017; (Continued)

(56) References Cited

U.S. PATENT DOCUMENTS 7,912,246 B1 * 3/2011 Moon .................. G10L 15/183
382/118
9,235,799 B2 1/2016 Yu et al.
(Continued)

FOREIGN PATENT DOCUMENTS

JP 2005199403 A 7/2005
WO WO-2018083671 A1 * 5/2018 ............ G06N 20/00
(Continued)

OTHER PUBLICATIONS

Muller et al: "Neural Language Codes for Multilingual Acoustic Models", arxiv.org, Cornell University Library, 201 Olin Library Cornell University Ithaca, NY 14853, Jul. 5, 2018 (Jul. 5, 2018), XP081244317. (Year: 2018).*
(Continued)

*Primary Examiner* — Abdelali Serrou
(74) *Attorney, Agent, or Firm* — Kilpatrick Townsend & Stockton LLP

(57) ABSTRACT

Computer-implemented methods and apparatus that use neural modulation codes as an alternative to training many individual recognition models or to loosing performance by training mixed models. Large neural models are modulated by codes that model the different conditions. The codes directly alter (modulate) the behavior of connections in a multiconditional perceptual classifier, so as to permit the most appropriate neuronal units and their features to be
(Continued)

applied to each condition. The approach may be applied to multilingual ASR, where the resulting multilingual network arrangement is able to achieve performance that is competitive or better than individually trained mono-lingual network. Moreover, the approach requires no adaptation data or extensive adaptation/training time to operate in a manner tuned to each condition. Beyond multilingual speech processing systems the approach can be applied to many other perceptual processing problems (e.g. speech recognition, speech synthesis, language translation, image processing) to factor the processing task from the conditioning variables that drive the actual realization. Instead of adapting or retraining neural systems to individual conditions, it modulates a large invariant network to operate in different modes based on conditioning codes that are provided by auxiliary networks that model these conditions.

20 Claims, 9 Drawing Sheets

(58) Field of Classification Search
CPC ...... G06F 3/013; G06F 3/012; G06F 3/04815; G06F 3/005; G06F 3/0346; G06F 3/0482; G06F 3/04883; G06F 3/04842; G06F 3/167; G06F 3/0484; G06F 2203/04806; G06F 3/01; G06F 3/0304; G06F 18/214; G06F 3/1423; G06F 3/04845; G06F 3/14; G06F 3/0488; G06F 3/147; G06F 1/163; G06F 1/1686; G06F 18/22; G06F 3/016; G06F 40/58; G06F 1/3231; G06F 3/04812; G06F 1/3203; G06F 1/3215; G06F 1/3218; G06F 1/3265; G06F 18/217; G06F 18/24; G06F 21/6218; G06F 21/6227; G06F 2203/04804; G06F 2218/08; G06F 3/0425; G06F 3/0481; G06F 3/04817; G06F 3/0483; G06F 3/04847; G06F 9/451; G06F 1/1616; G06F 1/1641; G06F 1/1677; G06F 1/1683; G06F 1/1698; G06F 11/22; G06F 16/5866; G06F 16/7837; G06F 16/784; G06F 16/9024; G06F 18/241; G06F 18/24143; G06F 2203/011; G06F 2203/04801; G06F 2203/04803; G06F 3/0236; G06F 3/0486; G06F 3/1431; G06F 30/27; G06F 40/109; G06F 1/3228; G06F 11/324; G06F 16/248; G06F 16/29; G06F 17/18; G06F 18/213; G06F 18/2148; G06F 18/2193; G06F 18/2411; G06F 18/2414; G06F 18/2415; G06F 18/253; G06F 21/31; G06F 21/62; G06F 2218/02; G06F 2218/04; G06F 2218/12; G06F 3/041; G06F 3/1454
See application file for complete search history.

(56) References Cited

U.S. PATENT DOCUMENTS

| | | | | |
|---|---|---|---|---|
| 9,721,561 | B2 * | 8/2017 | Tang | G10L 15/07 |
| 10,008,196 | B2 * | 6/2018 | Maisonnier | G10L 15/22 |
| 10,147,442 | B1 * | 12/2018 | Panchapagesan | G10L 15/063 |
| 10,956,820 | B2 | 3/2021 | Mnih et al. | |
| 11,625,573 | B2 * | 4/2023 | Gliozzo | G06F 40/20 |
| | | | | 706/15 |
| 11,735,199 | B2 * | 8/2023 | Duong | G10L 21/013 |
| | | | | 704/268 |
| 11,954,881 | B2 * | 4/2024 | Meier | G06F 18/251 |
| 2004/0181497 | A1 * | 9/2004 | Dodgson | G10L 15/22 |
| | | | | 706/23 |
| 2013/0138436 | A1 * | 5/2013 | Yu | G06N 3/08 |
| | | | | 704/E15.017 |
| 2014/0328487 | A1 | 11/2014 | Hiroe | |
| 2015/0149165 | A1 * | 5/2015 | Saon | G10L 15/16 |
| | | | | 704/232 |
| 2016/0034811 | A1 * | 2/2016 | Paulik | G06N 3/0499 |
| | | | | 706/20 |
| 2016/0110642 | A1 * | 4/2016 | Matsuda | G06F 40/30 |
| | | | | 706/25 |

FOREIGN PATENT DOCUMENTS

| | | |
|---|---|---|
| WO | 2018150550 A1 | 8/2018 |
| WO | 2020122985 A1 | 6/2020 |

OTHER PUBLICATIONS

Cui et al. ("Embedding-Based Speaker Adaptive Training of Deep Neural Networks", arxiv.org, Cornell University Library, 201 Olin Library Cornell University Ithaca, NY 14853, Oct. 17, 2017 (Oct. 17, 2017), XP080829918 (Year: 2018).*
EP Search Report and Written Opinion for EP Application No. 19894809, dated Oct. 28, 2022.
Muller et al., "Neural Language Codes for Multilingual Acoustic Models", ARXIV.org, Cornell Unv. Library, Ithaca, NY, Jul. 5, 2018; pp. 1-5.
Cui et al., "Embedding-Based Speaker Adaptive Training of Deep Neural Networks," ARXIV.org, Cornell Univ. Library, Ithaca, NY, Oct. 17, 2017; pp. 1-5.
JP Application No. JP2021-533355, "Office Action", Jul. 11, 2023, 8 pages.
International Search Report and Written Opinion for International PCT Application No. PCT/US2019/036029, dated Oct. 2, 2019.

* cited by examiner

NEURAL MODULATION CODES FOR MULTILINGUAL AND STYLE DEPENDENT SPEECH AND LANGUAGE PROCESSING

PRIORITY CLAIM

The present application claims priority to U.S. provisional patent application Ser. No. 62/777,340, filed Dec. 10, 2018, with the same title and inventors as indicated above, and which is incorporated herein by reference.

BACKGROUND

The realization of human speech is affected by numerous phenomena that influence the way we enunciate and speak to each other. Among these affects are the language itself, regional accents, language background of the speaker, gender and age of the speaker, psychological and emotional state of the speaker, social roles, relationships between speakers, environmental noise, and many more. Due to the resulting variability, automatic recognition of human speech is faced with a high degree of variability and thus potentially degraded performance.

To compensate, advanced Automatic Speech Recognition (ASR) systems generally train large models using speech from multiple such factors to achieve generalization across these conditions, or separate systems are trained for each of the individual conditions. Either solution is not optimal. The former produces models that attempt to average across multiple conditions and thus lacks the specificity and sharpness of condition dependent models, while the latter usually suffers under data-fragmentation, as it reduces the amount of training data available for each condition.

This trade-off between specificity and training data can be found in most ASR systems and is often solved with a compromise, where specificity is maximized to the level of available training data. As a result, however, performance within each condition is not optimal. And building additional separate condition-dependent versions of a system (for example, for each language, accent, or speaker profiles) even when data is available adds software complexity and maintenance effort.

Mixed condition approaches are typically used for speaker-independent acoustic modeling, where data from many speakers is more readily available than from one speaker alone and to avoid maintaining individual speaker profiles. Hence speaker-independent modeling trained with more data is generally superior to speaker-dependent models trained with a fraction of the data, even though such models lack specificity. Further improvements have been achieved by adapting ASR models to specific speakers from speaker-independent models using (a limited amount of) speaker-specific data.

For multilingual ASR, by contrast, individual systems are typically chosen for each language. Even though, linguistically, all languages of the world use a subset out of one common inventory of "phonemes" (the International Phonetic Alphabet "IPA"), the acoustic realization of the each of these phonemes may differ significantly between languages. Acoustic models trained in one language will generally not work well at all when simply applying them from one language to another, due to these differences in acoustic realization. Acoustic models trained on data from multiple languages work somewhat better, but their performance is still considerably worse than systems trained for each language separately.

As a result, all multilingual ASR systems today are constructed as large arrangements of mono-lingual systems that are trained on data from each required language, individually.

Here, too, adaptive approaches have been proposed to close the gap between multilingual and monolingual performance, but still require considerable data and language dependent tuning.

Unfortunately, all this requires costly data collection efforts and extensive system development. While language-dependent systems do work better, they require large collections of data for each language. This is feasible for a few of the largest language groups of the world, but it is impractical if not impossible to do for all 7000+ languages of the world. Worse, language effects are only one of many influencing factors. What if speakers have accents, i.e. speak one language, with enunciation of another. Actual speech production is further affected by speaker differences, age, emotion, dialect, noise, stress, etc. Due to the combinations of all these effects, training individual systems for each such condition is clearly impossible.

As a compromise, adaptation was also applied to the problem of multilinguality. Prior to the re-emergence of neural networks, these methods were typically implemented in ASR systems that were realized by Gaussian mixture model (GMM)/Hidden Markov model (HMM) based approaches. Methods for training/adapting such systems cross- and multilingually were proposed to handle data sparsity, such as described in: (i) Schultz and Waibel, "Fast bootstrapping of LVCSR systems with multilingual phoneme sets," *Fifth European Conference on Speech Communication and Technology,* 1997; (ii) Schultz and Waibel, "Multilingual and crosslingual speech recognition," *Proc. DARPA Workshop on Broadcast News Transcription and Understanding,* pp. 259-262, 1998; and (iii) Stuker, "Acoustic modeling for under-resourced languages," PhD diss., 2009.

The process of clustering context-independent phones into context-dependent ones can also be adapted to account for cross- and multilinguality, such as described in Stuker, "Modified polyphone decision tree specialization for porting multilingual grapheme based ASR systems to new languages," *IEEE International Conference on Acoustics, Speech and Signal Processing, ICASSP* 2008, pp. 4249-4252, 2008.

Supplying additional features to neural networks for adaptation to certain conditions is also a common technique. A very common method for speaker adaptation is using i-Vectors which are a low-dimensional representation of speaker and/or channel characteristics, such as described in: (i) Dehak, Najim, Patrick J. Kenny, Réda Dehak, Pierre Dumouchel, and Pierre Ouellet, "Front-end factor analysis for speaker verification," *IEEE Transactions on Audio, Speech, and Language Processing* 19, no. 4 (2011): 788-798; and (ii) Saon, George, Hagen Soltau, David Nahamoo, and Michael Picheny, "Speaker adaptation of neural network acoustic models using i-vectors," *ASRU,* pp. 55-59, 2013.

Based on these vectors, speaker adaptive networks can be trained, as described in Miao, Zhang and Metze, "Towards speaker adaptive training of deep neural network acoustic models," *Fifteenth Annual Conference of the International Speech Communication Association,* 2014.

All these methods, however, did not learn implicit models of the influencing conditions, did not perform as well as condition dependent methods, and/or required considerable adaptation data and time.

SUMMARY

In one general aspect, the present invention is directed to computer-implemented methods and apparatus for neural modulating codes that offer an alternative to training many individual recognition models or to loosing performance by training mixed models. Rather than mixing data from many conditions to achieve a mixed (and thus washed-out) model, large neural models are trained that are modulated by codes that represent the different conditions. The codes directly alter (modulate) the behavior of connections in a main task-performance network, which could be a multiconditional acoustic model, so as to permit the most appropriate neuronal units and their features to be applied to each condition. The approach is therefore very fast, requires little or no adaptation data, can achieve precise specific modeling and can be implemented in much more compact models than building many networks for each condition.

The approach may be applied to multilingual ASR, where the resulting multilingual network arrangement is able to achieve performance that is competitive or even better than individually trained mono-lingual network. Moreover, the approach requires no adaptation data or extensive adaptation/training time to operate in a manner tuned to each condition.

Beyond multilingual speech processing systems the approach can be applied to many other speech/language processing problems to factor the processing task from the conditioning variables that drive the actual realization. Instead of adapting or retraining neural systems to individual conditions, it modulates a large invariant network to operate in different modes based on conditioning codes that are provided by auxiliary networks that model these conditions.

These and other benefits of the present invention will be apparent from the description that follows.

DRAWINGS

Various embodiments of the present invention are described herein by way of example in connection with the following figures, wherein.

DESCRIPTION

A preferred embodiment of the present invention combines two networks: a task-performance network, which is adapted by an auxiliary network. This auxiliary network delivers a control code that configures the main task-performance network to peculiarities of a condition modeled by the auxiliary network. Applied via modulation (multiplication instead of additive weights), the control (or modulation) code from the auxiliary network reconfigures the connections within the main task-performance network. For example, where the main-task performance network models language-independent speech recognition, the auxiliary network may model a condition that affects speech recognition, such as identification of the spoken language, accents, dialect, etc. The acoustic model may thereby be adapted to, for example, a Southern accent or other language peculiarity, and then proceed to recognize speech under the assumption of the input being Southern accented speech. The code itself is powerful enough to not only encode discrete properties like "French" or "German" languages and accents, but also to encode properties of a mixture thereof, without explicit knowledge of the language at hand and even for languages unseen by the auxiliary network.

The auxiliary network may first be trained on a large corpus to classify languages or accents, as the case may be. That is, the auxiliary network is preferably trained prior to the main task-performance network being trained, so that the modulation codes can be used in the training of the main task-performance network. While the output of the auxiliary network (e.g., classification of languages) is not used in the main network, the auxiliary networks helps, for example, in establishing language codes. The auxiliary network preferably includes a very narrow, so-called "bottleneck" non-final layer through which the features required for language identification have to pass, although other techniques for extracting the features of the auxiliary network besides a bottleneck layer may be used. As language identification is not the goal of the main task-performance network, the hidden representations from the auxiliary network (e.g., the firing patterns of the neurons in the bottleneck layer) are used by the main task-performance network as they have hopefully extracted features to discriminate languages. To use these features, in various embodiments, another intermediate mapping layer or "converter" network, which maps the extracted language features into language codes that control the recognition network, is introduced.

Figure 1:
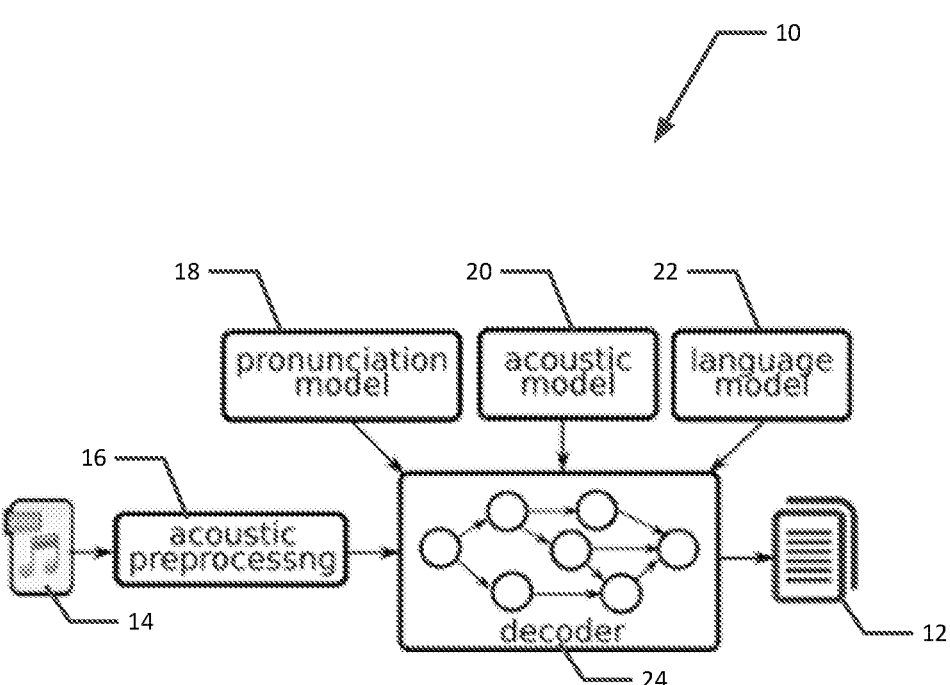
FIG. 1 is a diagram of a ASR system according to various embodiments of the present invention.

One scenario where embodiments of the present invention can be used is in an Automatic Speech Recognition (ASR) system 10, such as depicted in FIG. 1. The ASR system 10 generates a written transcript 12 from either pre-recorded or live audio data 14. An acoustic preprocessing module 16 identifies zones containing speech in the recordings 14 and transforms them into sequences of acoustic parameters. A pronunciation model 18 associates words with their phonetic representations. An acoustic model 20 predicts the most likely phonemes in a speech segment. A language model 22 predicts the most likely sequence of words among several texts. Finally, a decoder 24 combines the predictions of acoustic and language models and highlights the most likely text transcript 12 for a given speech utterance.

With a language-independent speech recognition network for the acoustic model 20, the ASR system 10 of FIG. 1 can support the recognition of speech from multiple languages in parallel. A dataset of recordings from the Euronews TV station can be used to train the networks of the multilingual acoustic model 20. For example, many hours (e.g., 70 hours) of transcribed data per language can be used, with a total of 10 languages. Of course, in other embodiments, a different number of languages could be used.

Figure 2:
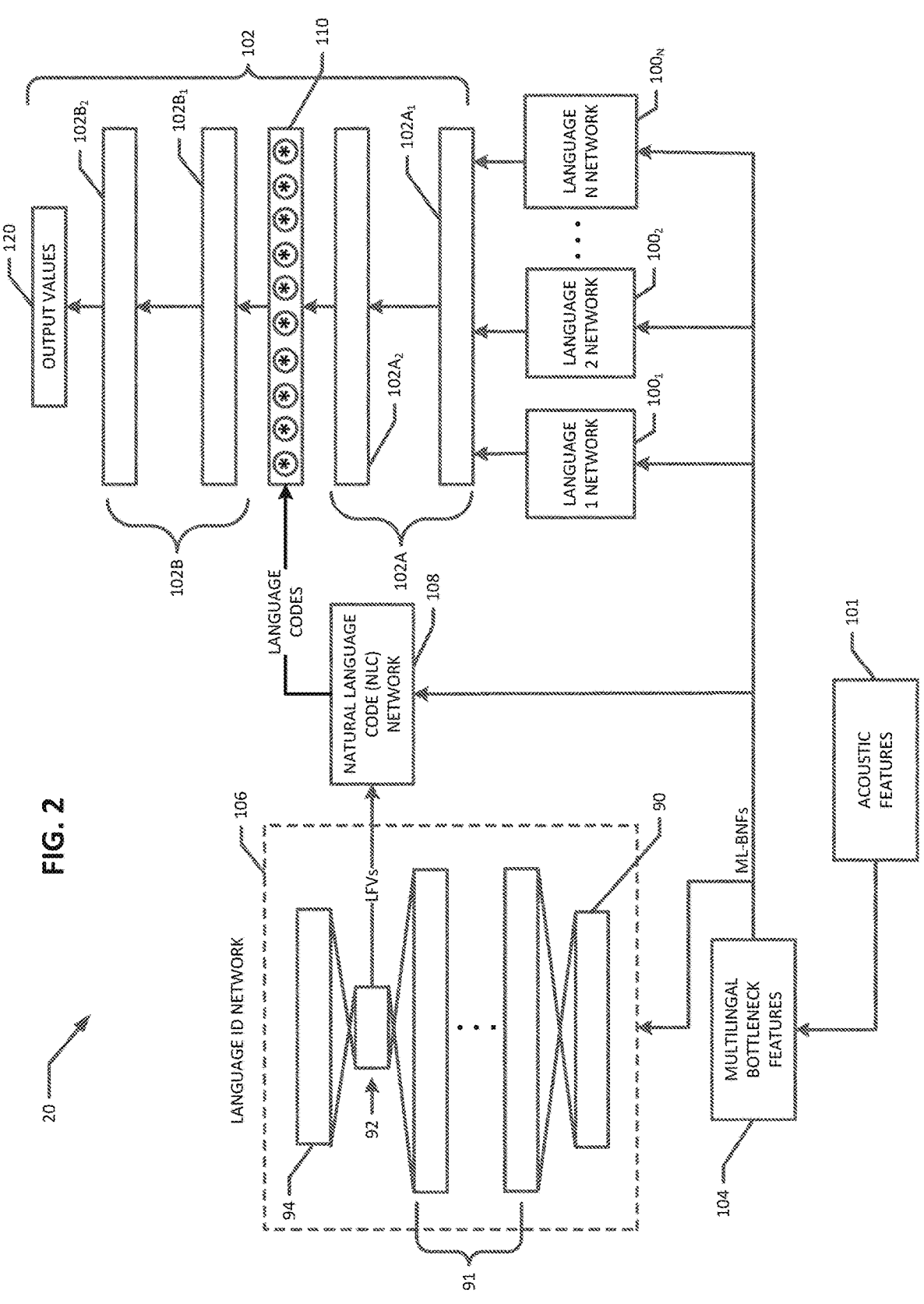
FIGS. 2 and 8-10 are diagrams of a combinational superstructure network according to various embodiments of the present invention.

FIG. 2 is a block diagram of a composite network that may be used for the acoustic model 20 according to various embodiments of the present invention. As shown in FIG. 2, the multilingual acoustic model 20 recognizes N>1 different languages, with each of the N languages having a unique sub-network $100_{1-N}$. The acoustic model 20 further comprises the main task-performance network 102 to perform language-independent speech recognition that may be implemented with a deep, recurrent neural network. As will be clear from the description that follows, the task-performance network 102 could be used for other tasks besides language-independent speech recognition, such aw _____. As shown in FIG. 2, the task-performance network 102 comprises an upper portion 102B of layers, a lower portion 102A of layers, and a modulation layer 110 therebetween. The lower portion 102A comprises an input layer $102A_1$ and N hidden layers $102A_2$, and the upper portion comprises an output layer $102B_2$ and M hidden layers $102B_1$, where N≥0 and M≥0. Preferably, N+M>1 and, more preferably, N=M=1, as depicted in FIG. 2, although in other embodiments different numbers of hidden layers in the upper and lower portions 102A-B may be employed. The modulation layer 110 is between the lower and upper portions 102A-B and comprise P nodes, where P≥1.

Figure 3:
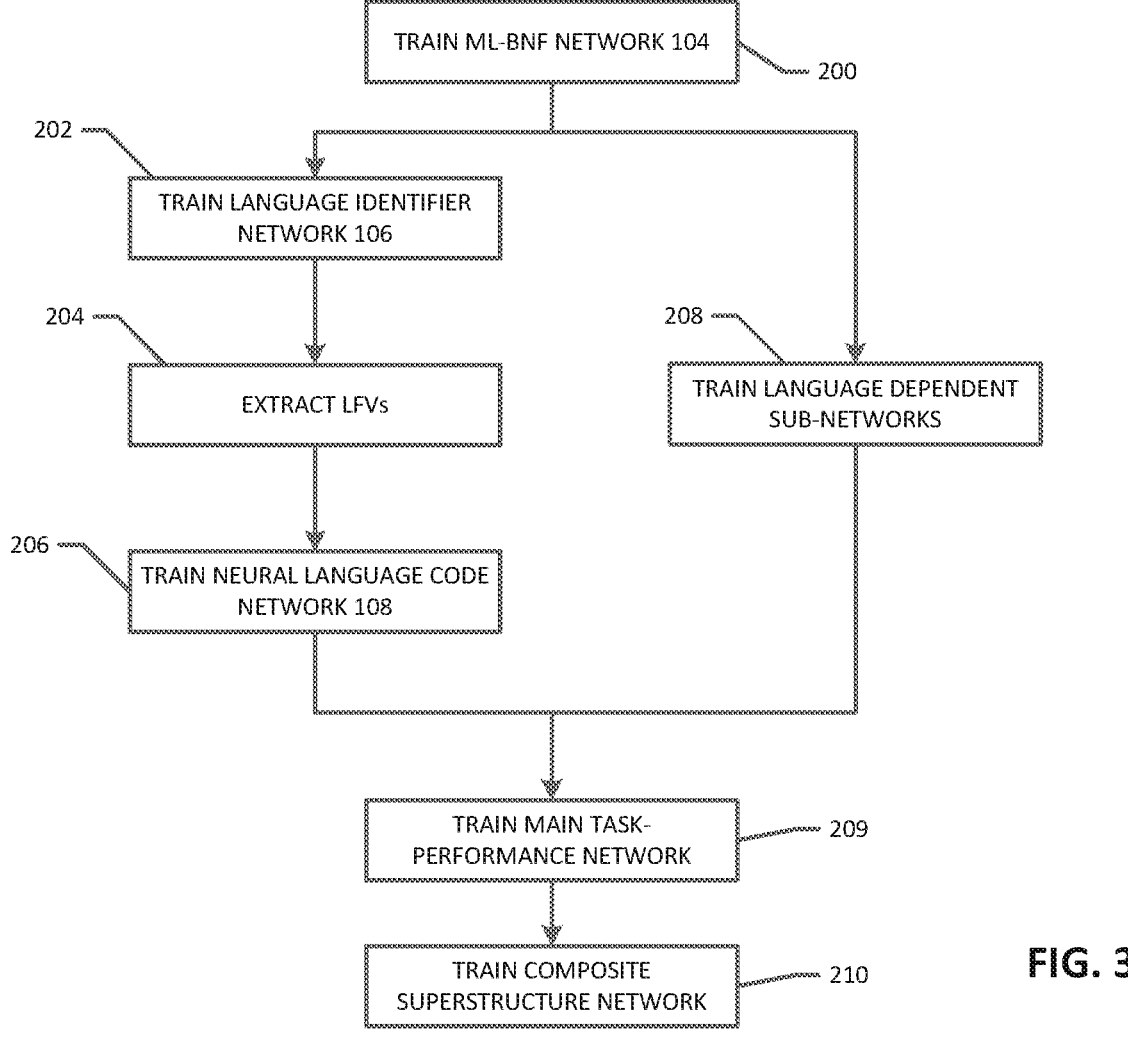
FIG. 3 is a flow chart illustrating a method for training the combinational superstructure network of FIG. 2 according to various embodiments of the present invention.

A method of training the composite superstructure network 20 according to various embodiments of the present invention is shown in FIG. 3. In the description to follow, it is assumed that the main task-performance network is for language-independent speech recognition and that the aux-iliary network 106 is for identifying the spoken language, although the training technique could be used for a main task-performance network with a different task, as is clear from the present description. In FIG. 3, a first step, step 200, is to train front end features for the recognition module. Several methods can be used for this level. For example, a multilingual bottleneck feature (ML-BNF) network 104, which may be implemented as a feed-forward neural net-work, is trained to extract multilingual bottleneck features from input acoustic features 101. The ML-BNF network 104 may comprise a very narrow layer (the bottleneck) as the second to last layer; e.g., a layer with less than 5% of the neurons of the layer that feeds the bottleneck. After training the ML-BNF 104, the output activations of this bottleneck layer, so-called "multilingual bottleneck features" (ML-BNF), are used as input to the other networks, as described below.

The ML-BNF network 104 can be trained, for example, to discriminate sub-phones. To generate training data, a tradi-tional DNN/HMM based setup can be used. Log Mel scaled filter bank coefficients and tonal features (the fundamental frequency variation and pitch tracker) with a total dimen-sionality of fifty-four can be used as input acoustic features 101 for this embodiment. These acoustic features 101 can be extracted using a 32 ms window with a 10 ms frame-shift. For each language in the training data, a separate system can be trained. As training data, five languages (German, French, Italian, Russian, and Turkish) with seventy hours of data per language can be used, for example. Fewer or more and/or different languages can also be used. In various embodi-ments, the ML-BNF network 104 may consist of five (5) large feed-forward layers with 1,600 neurons each, followed by a narrow bottleneck layer with only 42 neurons. After the bottleneck, another large (1,600 neurons) layer is added. The output layer may feature 6006 neurons, one for each context-dependent sub-phone with six (6) additional neurons for noise models.

The ML-BNF network 104 may be trained at step 200 of FIG. 3 in two steps: a training and a development set with a ratio of 9:1, for example. The ML-BNF 104 may be greedy layer-wise pre-trained as a denoising auto-encoder and then fine-tuned using labels extracted via a traditional speech recognition system. For the fine-tuning, a newbob learning rate scheduling may be used with an initial learning rate set to 1.0, for example. The exponential decay of the learning rate may be started when the error on the development set decreases by less than, for example, 0.5% between two epochs and the training may be stopped when the error does not decrease by more than 0.01% between epochs, for example. As loss function, cross entropy can be used. To apply the updates to the parameters, a mini-batch size of 250 may be chosen.

For the multilingual training of the ML-BNF network 104, multiple, language-dependent output layers may be used, while the hidden layers of the network 104 are shared across languages. In various embodiments, a combination of five (5) languages may be used to train the ML-BNF network 104: German, French, Italian, Russian and Turkish. In other embodiments, fewer or more or other languages may be used. After the training, all layers after the bottleneck layer are discarded and the output activations of the bottle-neck layer, so-called "multilingual bottleneck features" (ML-BNF), are used as input to the other networks, as described below. In other embodiments, other techniques for extracting relevant ML features from the input acoustic features besides a bottleneck layer may be used.

As shown in FIG. 2, the composite superstructure network 20 may also comprise a language identifier (LID) network 106 as the auxiliary network, which may be trained, at block 202 of FIG. 3, following the same general training scheme as the ML-BNF network 104, with the output activations of the bottleneck layer 92 of the LID network 106 encoding arbitrary language properties. As the LID network 106 is supposed to learn to discriminate languages, a larger context window may be used as the language properties are longer-duration in nature (in comparison to phones). Various embodiments may use a context window of +/−33 frames, covering a segment of approx. 700 ms of audio. This enables the LID network 106 to capture longer-duration language features. The ML-BNFs from the ML-BNF network 104 may be used as input features to the LID network 106. The LID network 106 may be trained on data from nine (9) languages (German, French, Spanish, Italian, Arabic, Rus-sian, Portuguese, Polish, and Turkish), for example. In other embodiments, fewer, more and/or other languages may be used.

Figure 4:
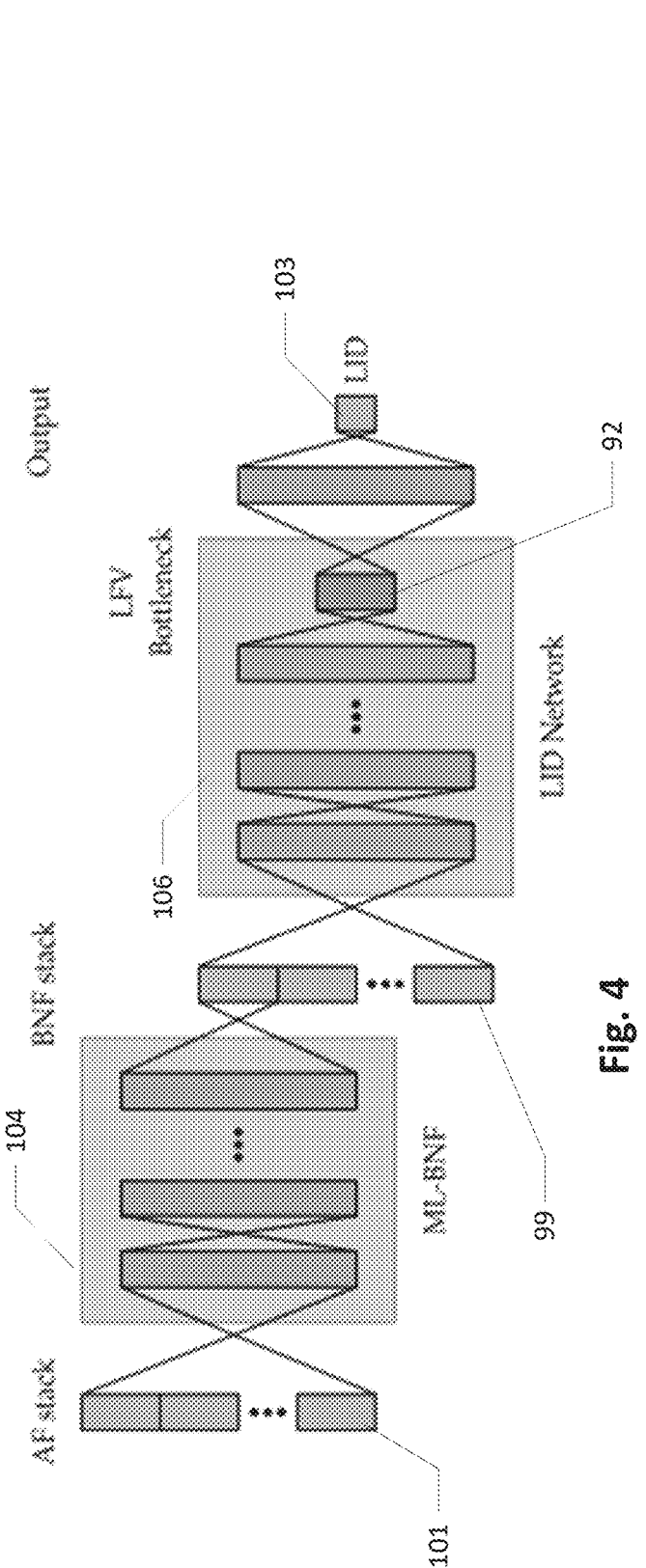
FIG. 4 is diagram illustrating the multilingual bottleneck feature (ML-BNF) network and the language identification (LID) network of FIG. 2 according to various embodiments of the present invention.

The LID network 106 may consist of, in various embodi-ments: an input layer 90; a number (e.g., 5) of hidden layers 91 with, for example, 2,000 neurons each; a narrow bottle-neck layer 92 with less than 5% of the amount of neurons compared to the other hidden layers 91; and an output layer 94 with one neuron per language. For example, the bottle-neck layer 92 may comprise about forty two neurons. For training this network 106, seventy hours of data from the nine languages may be used, for example. The data may be split into a training and development set with a ratio of 9:1. FIG. 4 shows the combination of both the ML-BNF network 104 and the LID network 106 trained for language identi-fication. It shows the acoustic features 101 being input to the ML-BNF network 104, which produces a bottleneck feature (BNF) stack 99, which is input to the LID network 106. The LID network generates a language ID (LID) 103 identifying the input language, but, as described herein, the output activations of the bottleneck layer 92 may be used as language feature vectors (LFVs) for modulating the task-performance network 102. In other embodiments, other technique for extracting the language feature vectors by the auxiliary/LID network 106 may be used besides a bottleneck layer.

Referring back to FIG. 2, the language-dependent subnetworks $100_{1-N}$ may be used as part of the composite superstructure network 20. In various embodiments, these language dependent subnets $100_{1-N}$ may also be recurrent neural networks that comprise BiLSTM units and having, for example, three layers each. A feed-forward layer may then map the outputs of the last LSTM layer to the targets. Using as input feature ML-BNFs from the ML-BNF network 104 with a context of +/−1 frame, these subnetworks $100_{1-N}$ may be trained, for example, at block 208 of FIG. 3, via the Connectionist Temporal Classification (CTC) loss function, to directly output characters. Alternate approaches may include Transformer Models, Hybrid NN/HMM models, and more. The subnetworks $100_{1-N}$ may be trained using stochastic gradient descent (SGD) with a learning rate of 0.0003 and a Nesterov momentum of 0.9, for example. For regularization, a gradient clipping of four hundred may be applied. In addition, newbob scheduling may be applied, where the learning rate is decreased by 50% if the error on the validation set does not decrease after an epoch. The training may end if the error does not decrease on two consecutive epochs. Given the memory constraints, a mini-batch size of fifteen utterances may be chosen, for example.

The utterances can be sorted and presented to the subnetworks $100_{1-N}$ ascending in length to stabilize the training. Shorter utterances are easier to align and especially during the first phase of the training, where the parameters of the main BiLSTM blocks are largely uninitialized. After training, the output layer of each subnetwork $100_{1-N}$ may be discarded, with the output of the last hidden layer used as inputs to the lower portion 102A of the main network. This has the advantage that each network $100_{1-N}$ can be trained on an individual set of targets without affecting the other networks.

Figure 6:
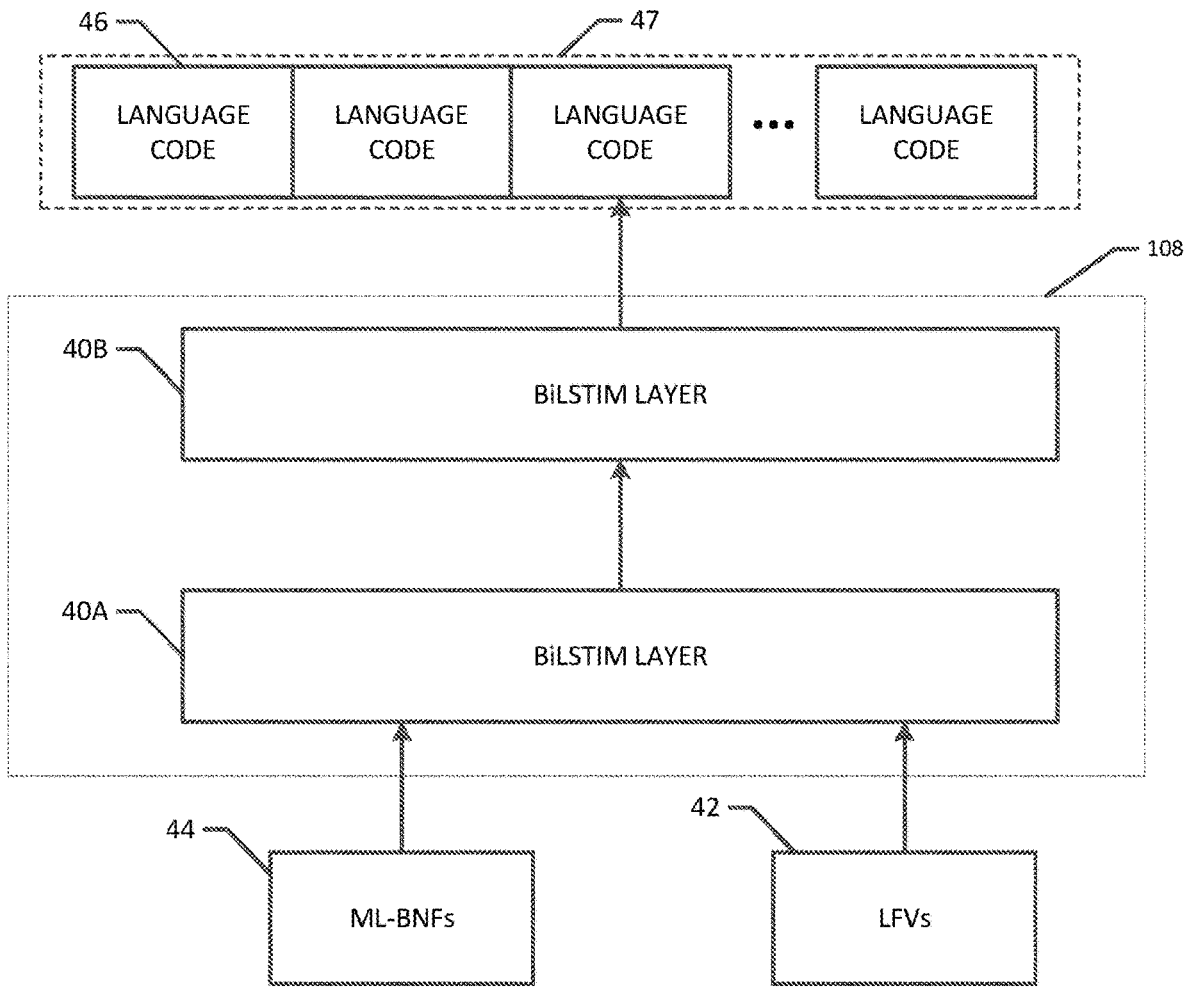
FIG. 6 is a diagram of a natural language code (NLC) network of FIG. 2 according to various embodiments of the present invention.

As shown in FIG. 2, the composite superstructure network 20 may also comprise a neural language code (NLC) network 108 acting as a "converter" network. In various embodiments, the NLC network 108 comprises a recurrent neural network, which may comprise bi-directional long short-term memory (BiLSTM) units. In various embodiments, as shown in FIG. 6, the NLC network 108 comprises two layers 40A-B with four hundred twenty (420) BiLSTM units per layer. The inputs to the NLC network 108 comprise the LFV 42 from the bottleneck layer 92 of the LID network 106 and the ML-BNFs 44 from the ML-BNF network 104.

Thus, referring to FIG. 3, the LFVs 42 from the LID network 106 can be extracted at step 204 and the NLC network 108 network can be trained at step 206 using the LFVs extracted on data of four (or some other number of) languages. Mean squared error may be used a loss function for the training the NLC network 108. Stochastic gradient descent with Nesterov momentum with a factor of 0.9 and a learning rate of 0.0003 may be used. During the training process, the NLC network 108 will most likely learn to simply forward the LFVs to the appropriate outputs and to ignore the acoustic features.

FIG. 3 shows that, in various embodiments, the language sub-networks 1001-N may be trained at step 208 in parallel with and/or independently of the training of the LID and NLC networks 106, 108 at steps 202, 206.

The outputs of the language dependent subnets $100_{1-N}$ may be combined and input into the main task-performance network 102. In various embodiments, the main task-performance network 102 may comprise two portions 102A, 102B of BiLSTM layers. The two blocks 102A-B may be of equal size, e.g., two layers with four hundred twenty (420) BiLSTM units per layer. A feed forward layer may be used as an output layer for the language dependent subnets $100_{1-N}$, with targets comprised of the union from the targets of all languages the embodiment is trained on. The output language codes 46 from the NLC network 108 may be stacked, as described below.

The main task-performance network may then be trained at step 209, after pre-training of the networks $100_{1-N}$, 104, 106 and 108. The parameters of the main task-performance network 102 may be initialized using Glorot initialization to keep the gradients in an optimal range during training. The main task-performance network 102 can be trained using dropout training with a dropout rate of 0.2, stochastic gradient descent with a learning rate of 0.0003, and Nesterov momentum with factor 0.9.

Figure 7:
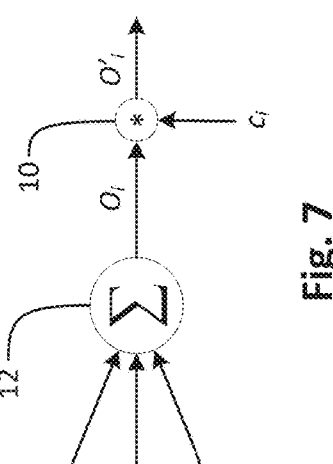
FIG. 7 shows one of the P nodes of the modulation layer of the main task-performance network and one node of the layer immediately prior to the modulation layer.

First introduced as part of Meta-PI networks, the modulation for the main task-performance network 102 can be implemented as special connections, which allow multiplying the output of a neural unit with a coefficient. In the original work, the modulation was used to combine the outputs of multiple source networks by a weighted sum, using one coefficient per network. In embodiments of the present invention, the modulation is applied in a different manner to the outputs of a layer of the lower portion 102A, e.g., the hidden layer $102A_2$ or the input layer $102A_1$ (if there is no higher hidden layer in the lower portion 102A). One method to alter the way in which networks learn features was proposed with "dropout training." By omitting connections between neurons randomly, dropout prevents co-adaptation, as each training step would see a different network configuration. Instead of randomly omitting connections between neurons, modulation emphasizes or attenuates the connections in the system described herein, based on language codes. This embodiment is therefore to be considered as an "intelligent" way of dropout, where connections are systematically altered instead of on a random basis. FIG. 7 shows one of the P nodes 10 of the modulation layer 110 of the main task-performance network 102 and one node of the layer (e.g., hidden layer $102A_2$) immediately prior to the modulation layer 110. The main task-performance network 102 will learn features modulated by language properties, as the outputs ($O_i$) of the neural units 12 of the layer feeding the modulation layer 110 are gated (multiplied) by corresponding language code values ($c_i$) from the NLC network 108. The modulation, therefore, is applied to the outputs of the upper/last layer 1 of the first block 102A, where each output is multiplied, as indicated by layer 110 in FIG. 2 and as shown in FIG. 7, with one coefficient of the output vector of the neural language code (NLC) network 108. The products gating operation, shown in FIG. 7 as value $O'_i$, are input to first layer (e.g., the hidden layer $102B_1$) of the second block 102B.

The BiLSTM layers of the main task-performance network 102 may have a size that is a multiple of the size of the language codes LCs (which might be the size of the LFVs as described herein). To match both sizes, the language codes 46 can be stacked multiple times, in stack 47 as shown in FIG. 6. That is, for example, if a language code has β nodes (or coefficients), then the output layer $102A_2$ of the lower sub-network 102A, the input layer $102B_1$ of the upper sub-network 102B, and the modulation layer 110 can all have P=A×β nodes, where A is an integer greater than or equal to one.

In various embodiments, the main task-performance network 102 can be jointly trained with the NLC network 108. That is, for example, the combination of the main task-performance network 102 and the converter/NLC network 108 may be trained jointly, where the converter/NLC network 108 is trained to optimize a loss function of the joint network. Also, following training of the main task-performance network at step 209 (whether jointly with the NLC network 108 or not), the composite superstructure 20 (e.g., the networks 101, 104, 106, 108 and 102) optionally can be jointly trained at step 210. During the joint training of the combinational superstructure at step 210, the parameters of all networks are preferably updated. This includes in particular the language dependent subnets $100_{1\text{-}N}$, as well as the NLC network 108. The latter will alter the language codes to code a more useful representation of language properties, targeted towards speech recognition. Using this embodiment, the multilingual setup achieves a WER of 23.5%, compared to 25.3% of the monolingual baseline. Without any means of adaptation, a multilingual system would have a WER of 27.4%, which is higher than the monolingual baseline.

Figure 5:
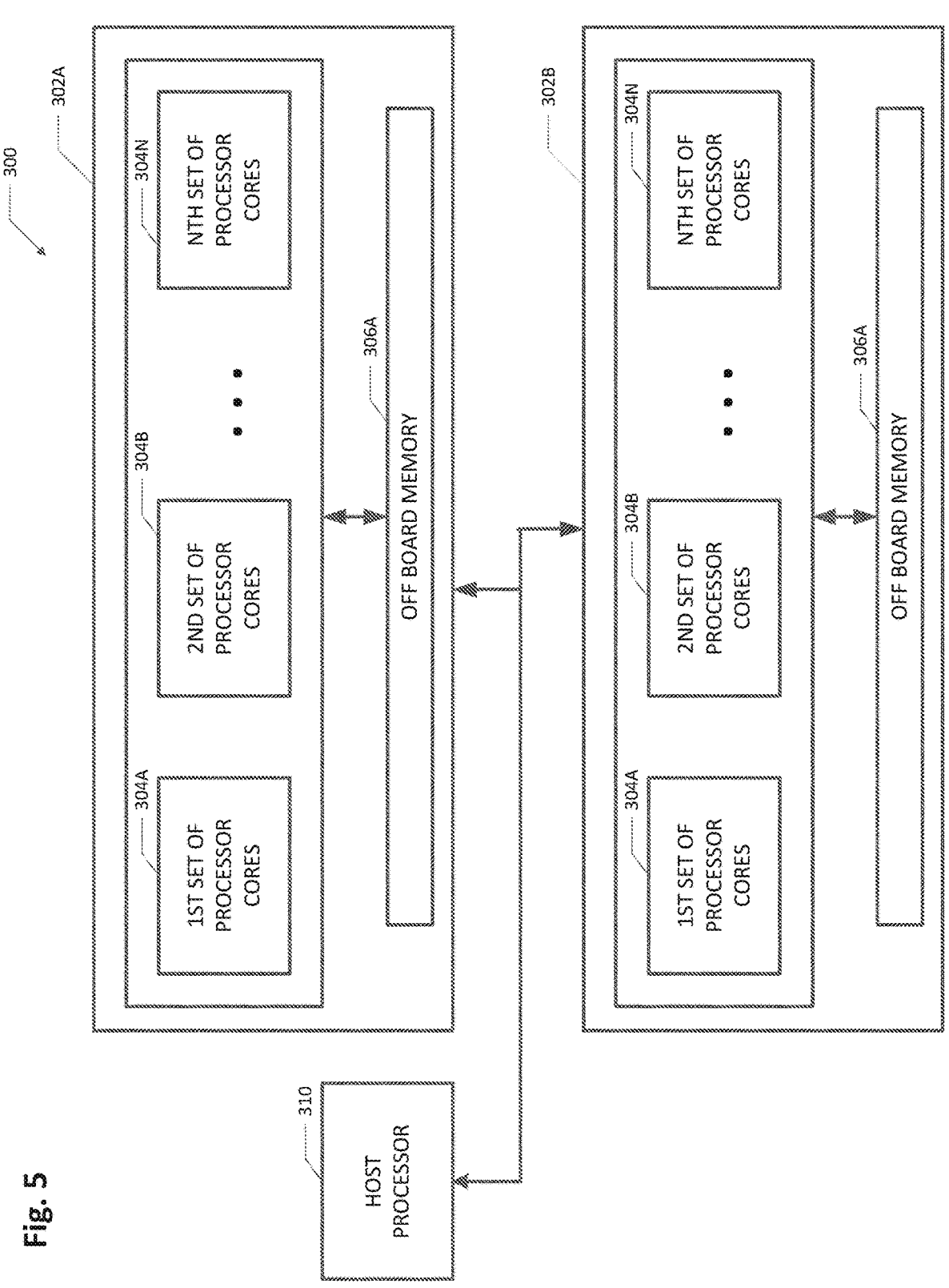
FIG. 5 is a diagram of a computer system for performing the method shown in FIG. 3 according to various embodiments of the present invention.

FIG. 5 is a diagram of a computer system 300 that could be used to implement the embodiments described above. The illustrated computer system 300 comprises multiple processor units 302A-B that each comprises, in the illustrated embodiment, multiple (N) sets of processor cores 304A-N. Each processor unit 302A-B may comprise on-board memory (ROM or RAM) (not shown) and off-board memory 306A-B. The on-board memory may comprise primary, volatile and/or non-volatile, storage (e.g., storage directly accessible by the processor cores 304A-N). The off-board memory 306A-B may comprise secondary, non-volatile storage (e.g., storage that is not directly accessible by the processor cores 304A-N), such as ROM, HDDs, SSD, flash, etc. The processor cores 304A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 310 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 304 may train and/or implement different networks or subnetworks or components. For example, in one embodiment, the cores of the first processor unit 302A may implement the neural network 102 and the second processor unit 302B may implement the LID network 106 and the NLC network 108, for example. Further, the first set of processor cores 304A in the first processor unit 302A may be responsible for the network 102, the second set of processor cores 304B in the first processor unit 302A may be responsible for the LID network 106, the third set of processor cores (not shown) may be responsible for the NLC network, and the processor cores in the second processor unit 302B may be responsible for language sub-networks $100_{1\text{-}N}$, and so on. One or more host processors 310 may coordinate and control the processor units 302A-B.

In other embodiments, the system could be implemented with one processor unit 302. In embodiments where there are multiple processor units, the processor units could be co-located or distributed. For example, the processor units 302 may be interconnected by data networks, such as a LAN, WAN, the Internet, etc., using suitable wired and/or wireless data communication links. Data may be shared between the various processing units 302 using suitable data links, such as data buses (preferably high-speed data buses) or network links (e.g., Ethernet).

The software for the various compute systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

In various general aspects, therefore, the present invention is directed to a neural method and apparatus that factorizes classification, recognition, perception, and mapping tasks from external influences and variables, where the task is performed robustly under the modulating supervision of one or more auxiliary networks that control its mode of operation. The method comprises, in various embodiments, two modular elements: (1) the main task-performance network 102 performing the classification or prediction task, comprising neural connections with weights that are dynamically set by neural activation codes from auxiliary networks 106, 108; and (2) one or more auxiliary neural networks 106, 108 trained to perform an auxiliary task, with hidden nodes that define the neural activation codes.

In other general aspects, the present invention is directed to a neural adaptation method by neural modulation where the weights for certain nodes of the main classification network 102, i.e., the weights for neurons at layer 110 of the main classification network 102, are not retrained or adapted during classification or prediction runs, but are modulated by auxiliary codes, and thus requires little or no adaptation data.

In other general aspects, the present invention is directed a multilingual neural network that performs speech recognition in any of several languages without loss in performance, comprising of a main classification network 102 outputting phonetic class activations or probabilities (e.g., output values 120 in FIG. 2) given input speech signals, and neural language codes extracted from the hidden layers of a language identification network 106 trained to differentiate between languages given the same input speech (acoustic features 101).

In various implementations, the neural network architecture can be used for new, previously unseen or low-resource languages, where the neural language codes modulate the main network's behavior to operate optimally in a given new or low-resource language by way of language codes extracted from auxiliary networks 106, 108 that were trained on previously seen languages.

As mentioned herein, the main task-performance network 102 could be trained for tasks other than language-independent speech recognition. In general, the main task-performance network 102 could perform machine-learning tasks such as classification, prediction, mapping, coding, control, generalization, generation or synthesis, and/or summarization, for example. For example, in various embodiments, the main task-performance network 102 may trained for machine translation of input text, dialogue processing, speaker identification (or verification) or image recognition. The auxiliary network 106 can also model conditions other than language identification. For example, where the main task-performance network 102 is used for language-independent speech recognition or dialogue processing, the auxiliary network 106 may model other speech-affecting conditions besides (or in addition to) language identification, such as the identity of the speaker (the speaker is a particular person), the emotion of the speaker (the speaker is emotional or calm, for example), the dialect of the speaker, the accent of the speaker, the gender of the speaker, the politeness of the speaker, the formality of the speaker (e.g., is the speaker giving a university lecture or is the speaker conversing with friends) and/or background noise. The same speech-affecting conditions—except speaker identification/verification—could be used where the task of the main task-performance network 102 is speaker identification/verification.

Where the task of the main task-performance network 102 is machine translation, the auxiliary network 106 may model other text-affecting conditions besides (or in addition to) language identification, such as the identity of the author (the author is a particular person), the emotion of the text/author, the dialect of the text/author, the accent of the text/author, the gender of the author, the politeness of the text/author, the formality of the text (e.g., an academic paper or text message) and/or noisy text (e.g., typos, repetitions) in the text.

Where the task of the main task-performance network 102 is image recognition, the auxiliary network 106 may model image recognition-affecting conditions such as illumination in the image, an aspect of the image, shading in the image, rotation of the image, scaling of the image and/or occlusions in the image, for example.

For example, the approach for adaptation of a multilingual ASR network can also be used for dialects and accents, where the neural modulation adjusts the networks acoustic modeling to perform recognition optimally in one language given speech from a speaker speaking with an accent of one or more of the other languages. In other words, the auxiliary network (e.g. the LID network 106 and NLC network) may output a language code for the modulation layer 110 of the main task-performance network 102 that may be somewhat closer to another language that is different from the spoken language (say, for example Italian/English language code to signal the enunciation of an Italian speaker speaking English with an Italian accent).

Figure 8:
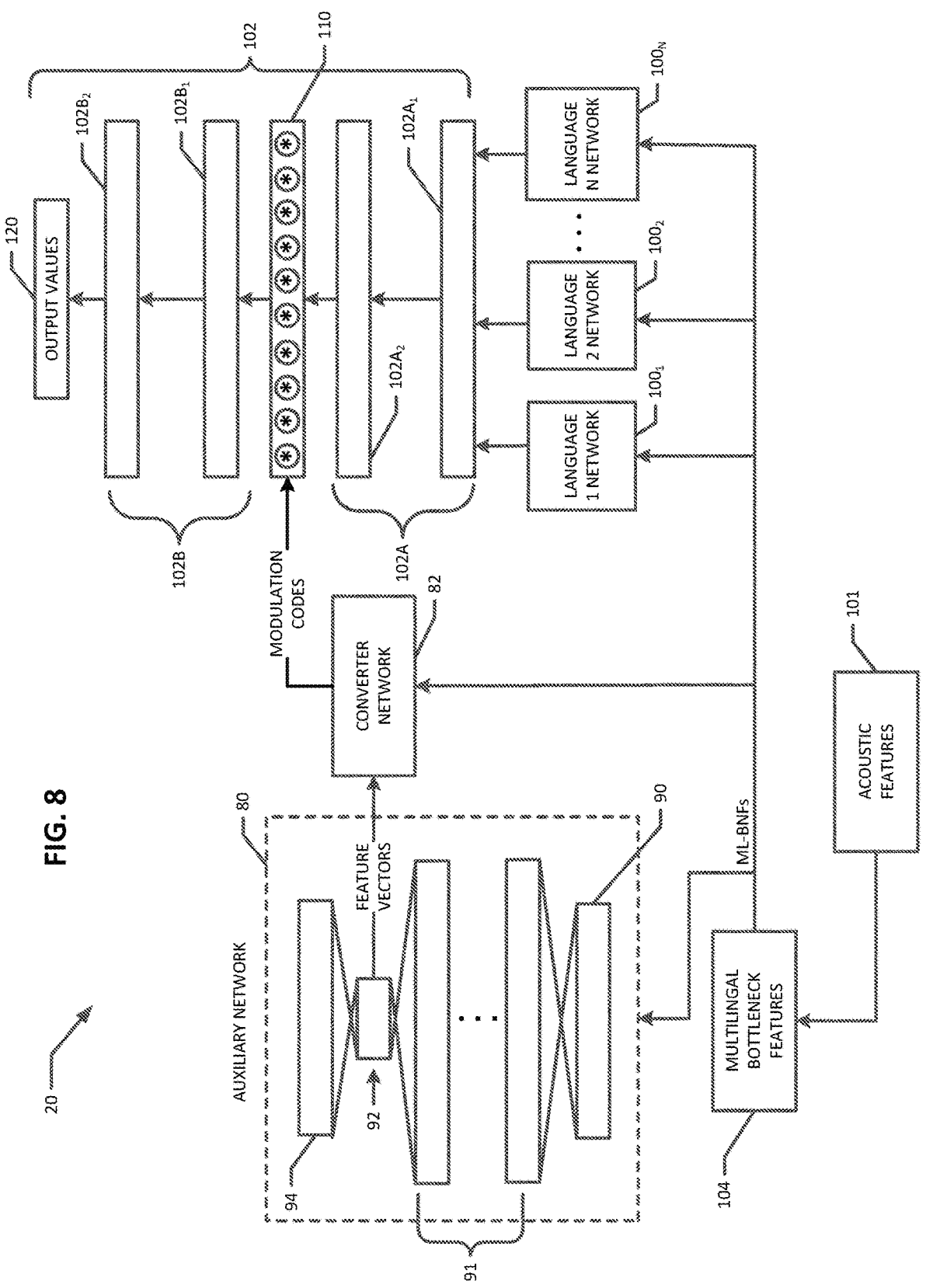

Further, the neural network architecture may be used to model other variables or conditions that affect the realization of speech and language. In all such embodiments, the auxiliary network is trained to detect and discern the condition affecting realization, and the hidden features are used to modulate the main task-performance network, as described above. Thus, instead of or in addition to Language Feature Vectors (LFV), features that model emotion, dialect, accent, formality, etc. can be trained. The process is the same, in that, with reference to FIG. 8, an auxiliary network 80 is trained to detect such conditions. Then, the hidden feature vectors (Emotion-, Dialect-. Accent-, Formality-, etc. Feature Vectors) are extracted and mapped via a trainable converter network 82 to the codes that modulate the main task-performance network 112 that performs the actual task (here ASR).

For example, the neural modulation and optimization method can be applied to speaker-adaptation, where the main task-performance network 102 performs speaker-independent recognition of speech, by way of its weights being modulated by speaker codes extracted from the hidden nodes of an auxiliary network (e.g., comprising BNF network 80 and converter network 82) trained to learn to differentiate between speakers.

The neural adaption and optimization method can also be applied to emotion-adaptation, where the main task-performance network 102 performs speaker-independent recognition of speech, by way of its weights being modulated by emotion codes extracted from the hidden nodes of the auxiliary network (e.g., comprising BNF network 80 and converter network 82) trained to learn to differentiate between emotions.

The neural adaption and optimization method can also be applied to style-adaptation, where the main task-performance network 102 performs style-independent recognition of speech, by way of its weights being modulated by style codes extracted from the hidden nodes of an auxiliary network (e.g., comprising BNF network 80 and converter network 82) trained to learn to differentiate between styles.

The neural adaption and optimization method can also be applied to formality-adaptation, where the main classification network 102 performs style-independent recognition of speech, by way of its weights being modulated by style codes extracted from the hidden nodes of an auxiliary network (e.g., comprising auxiliary network 80 and converter network 82) trained to learn to differentiate between levels of formal and informal speech.

Still further, the neural adaption and optimization method can be applied to noise-adaptation, where the main task-performance network 102 is trained to perform noise-independent recognition of speech, by way of its weights being modulated by noise codes extracted from the hidden nodes of the auxiliary network 80 trained to learn to differentiate between different noise environments and different levels of reverberation. In various implementations, the noise adaption is performed with the auxiliary networks 106, 108 that receive as additional inputs room impulse responses and/or room visual images as environmental features.

In still further implementations, the neural adaption and optimization method can be applied to condition speech-synthesis, where the main task-performance network 102 performs synthesis of speech, by way of its weights being modulated by codes extracted from the hidden nodes of the auxiliary network 80 trained to learn to differentiate between styles, language, gender, age, emotion, politeness, accent, dialect, formality, noise.

The neural adaption and optimization method may also be applied to style dependent neural machine translation, where a main task-performance network 102 performs optimal language translation, by way of their weights being modulated by style codes extracted from the hidden nodes of an auxiliary network 80 trained to learn to differentiate between styles. In various implementation of the style-dependent machine translation, the style codes are trained using additional social input information (gender, age, relationship . . . ) and/or additional style lexical features (formal/informal words, rude words, high/low frequency words, technical terms, etc.).

Figure 9:
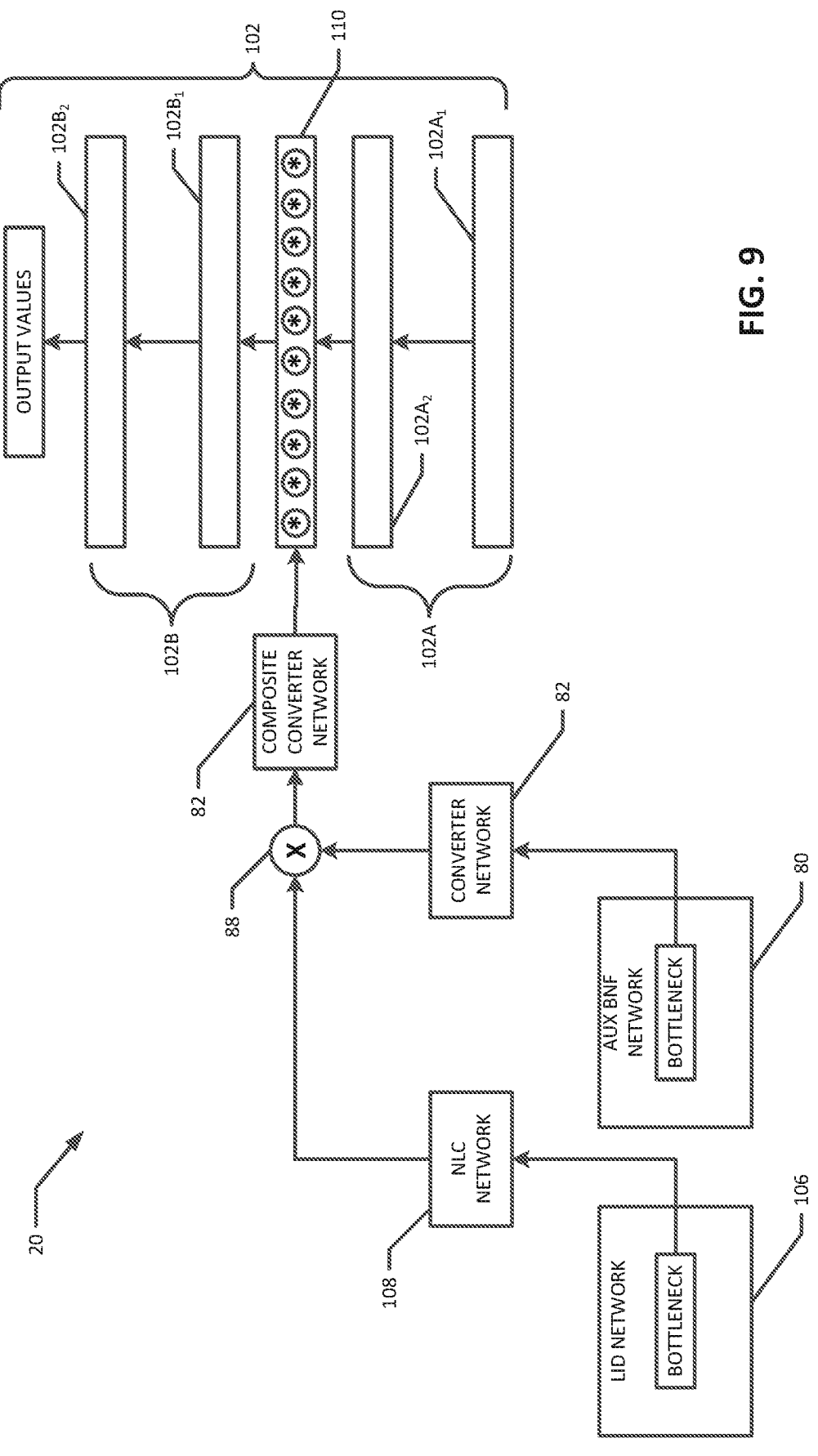

In still other embodiments, the composite superstructure network 20 may comprise two or more of such auxiliary networks, such as shown in the example of FIG. 9. FIG. 9 shows language codes from the NLC network 108 being combined with modulation codes from a second auxiliary network 80 and converter network 82, being combined by a combiner 88. A composite converter network 83 may be trained to map the output of the combiner 88 to the modulation codes for the modulation layer 110 of the main task-performance network 102. The composite converter network 83 could be trained jointly with the main task-performance network 102. Once trained, the output vector codes of the composite converter network 83 modulate the nodes of the modulation layer 110 of the main task-performance network 102. The first auxiliary network 106, 108 may generate LFVs as described herein, and the second auxiliary network 80, 82 may extract features that model emotion, dialect, accent, formality, etc., as described herein. Additional auxiliary networks that extract features that model different factors affecting speech could be added. Also, instead of combining the codes from each auxiliary network as shown in FIG. 9, the main task-performance network 102 may comprise multiple modulation layers 110. In such an embodiment, each auxiliary network 106, 80 may modulate a separate modulation layer 110 of the main network 102.

Figure 10:
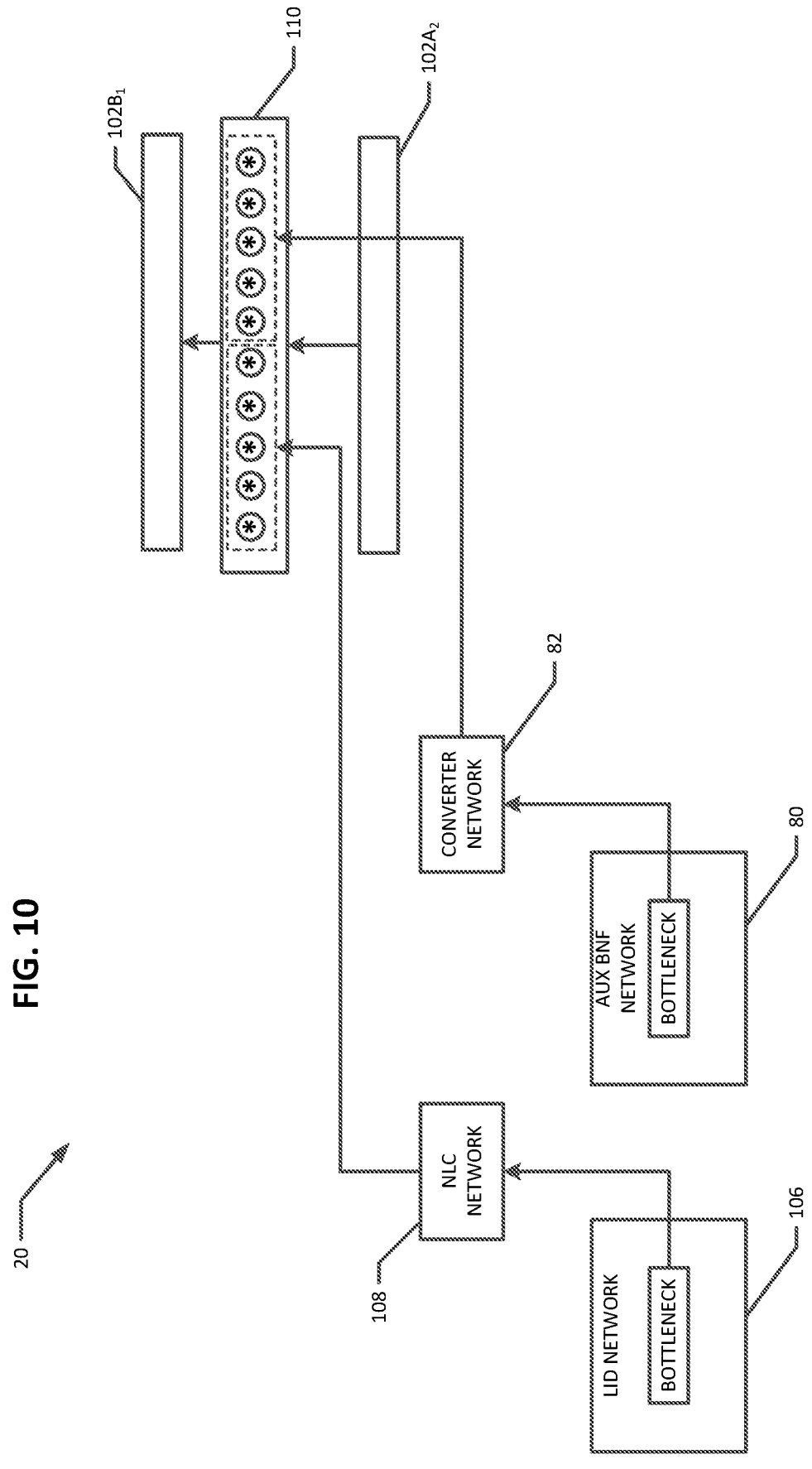

In yet other embodiments, instead of combining codes from separate auxiliary networks and having multiple modulation layers, the modulation codes from a first auxiliary network may modulate a first subset of nodes in a single modulation layer and the modulation codes from a second auxiliary network may modulate a second subset of the nodes in the same modulation layer. An exemplary depiction of such an embodiment is shown in FIG. 10, which, for purposes of clarity, only shows a portion of an exemplary main task-performance network 102. In this illustrative depiction, the modulation codes from a first auxiliary network 106 modulate a first half of the nodes of the modulation layer 100 and modulation codes from a second auxiliary network 80 modulate a second half of the nodes of the modulation layer 100. Additional auxiliary networks could also be employed, with each auxiliary network modulating a subset of the nodes of the modulation layer 110.

The neural adaption and optimization method may also be applied to condition dependent neural image recognition as described above. In such an embodiment, the main task-performance network 102 may be a visual recognition system that performs optimal image processing on input image features. The weights for the modulation layer 110 may be modulated in such an embodiment by codes extracted from the hidden nodes of an auxiliary network (e.g., network 106 or 80) trained to learn to differentiate between illumination, aspect, shading, rotation, scaling and/or translation in the input image feature. In various implementations of the condition-dependent image processing, the codes may be trained using additional contextual input information (time of day, location, direction, etc.) and/or the presence or absence of interfering objects and their relationships (sunglasses, occlusion, hair, etc.).

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages.

The disclosed embodiments are therefore intended to include all such modifications, alterations, and adaptations without departing from the scope of the embodiments as set forth herein.

What is claimed is:

1. A machine learning system comprising:
a non-transitory computer-readable medium; and
one or more processors, the one or more processors configured to execute a machine-learning, main task-performance network stored in the non-transitory computer-readable medium, the machine-learning, main task-performance network trained to perform a main machine-learning task, wherein the main task-performance network comprises a deep neural network, and wherein:
the deep neural network comprises:
an input portion comprising an input layer and N hidden layers, where N≥0;
an output portion comprising an output layer and M hidden layers, where M≥0; and
a modulation layer between the input portion and the output portion,
wherein the modulation layer comprises:
a plurality of nodes; and
connects the input portion to the output portion; and
a machine-learning ("ML") auxiliary network trained to perform an auxiliary machine learning task, wherein features extracted by the auxiliary network are used by the modulation layer of the main task-performance network during training of the main task-performance network to modulate outputs from the input portion to the output portion;
wherein:
the ML auxiliary network is configured to provide modulation codes to the modulation layer, the modulation codes comprise coefficients based on features extracted by the ML auxiliary network;
each of the nodes of the modulation layer multiplies an output from a node of the input portion of the main task-performance network by one of the coefficients of the modulation codes; and
the product of the multiplication being input to a node of the output portion of the main task-performance network.

2. The machine learning system of claim 1, where N≥1 and M≥1, and wherein the modulation layer connects a hidden layer of the input portion to a hidden layer of the output portion.

3. The machine learning system of claim 1, wherein the auxiliary network comprises a bottleneck layer that extracts the features.

4. The machine learning system of claim 1, wherein:
the modulation layer comprises P nodes, where P>1;
wherein the modulation codes comprise P coefficients that are based on the features extracted by the auxiliary network; and
each of the P nodes of the modulation layer, during training of the main classification network, multiplies an output from a node of the input portion of the main task-performance network by one of the P coefficients of the modulation codes from the auxiliary network, with a product of the multiplication being input to a node of the output portion of the main task-performance network.

5. The machine learning system of claim 4, wherein the auxiliary network comprises a bottleneck layer that extracts the features.

6. The machine learning system of claim 1, wherein the auxiliary network provides a modulation code to the modulation layer, and further comprising a machine-learning converter network connected between the auxiliary network and the modulation layer of the main task-performance network, wherein the converter network receives as input the features extracted by the auxiliary network and outputs the modulation code for the modulation layer.

7. The machine learning system of claim 6, wherein the converter network is trained to optimize a loss function of a joint network comprising the main task-performance network and the converter network.

8. A method for training a machine-learning, main task-performance network to perform a main machine-learning task, wherein the main task-performance network comprises a deep neural network that comprises:

an input portion comprising an input layer and N hidden layers, where N≥0;

an output portion comprising an output layer and M hidden layers, where M≥0; and a modulation layer between the input portion and the output portion, wherein the modulation layer comprises:

a plurality of nodes; and connects the input portion to the output portion, the method comprising:

training, through machine-learning, an auxiliary network to perform an auxiliary machine learning task;

after training the auxiliary network, extracting features by the auxiliary network from input features; and after extracting the features with the auxiliary network, training the main task-performance network, wherein training the main task-performance network comprises modulating nodes of the modulation layer of the main task-performance network with a modulation code that is based on the extracted features from the auxiliary network;

wherein:

the auxiliary network is configured to provide modulation codes to the modulation layer, the modulation codes comprise coefficients based on features extracted by the auxiliary network;

each of the nodes of the modulation layer multiplies an output from a node of the input portion of the main task-performance network by one of the coefficients of the modulation codes; and the product of the multiplication being input to a node of the output portion of the main task-performance network.

9. The method of claim 8, wherein:

the modulation layer comprises P nodes, where P>1;

wherein the modulation codes comprise P coefficients that are based on the features extracted by the auxiliary network; and each of the P nodes of the modulation layer, during training of the main classification network, multiplies an output from a node of the input portion of the main task-performance network by one of the P coefficients of the modulation codes from the auxiliary network, with a product of the multiplication being input to a node of the output portion of the main task-performance network.

10. The method of claim 9, further comprising, generating, by a machine-learning converter network connected between the auxiliary network and the modulation layer of the main task-performance network, the modulation code from the features extracted by the auxiliary network.

11. The method of claim 10, wherein:

the main machine-learning task comprises language-independent speech recognition; and the auxiliary machine learning task of the auxiliary network comprises language identification.

12. The method of claim 11, further comprising a plurality of unique, machine-learning, mono-lingual sub-networks, wherein outputs of the mono-lingual sub-networks are connected to the input portion of the main task performance network.

13. The method of claim 12, wherein each of the plurality of unique mono-lingual sub-networks receive as input the features extracted by the auxiliary network.

14. The method of claim 8, wherein the machine-learning auxiliary network comprises a plurality of machine-learning auxiliary networks, wherein each of the plurality of machine-learning auxiliary networks performs a separate auxiliary machine-learning task, and wherein features extracted by the plurality of machine-learning auxiliary networks modulate the outputs of the input portion at the modulation layer of the main task-performance network.

15. A non-transitory computer-readable medium comprising processor executable instructions configured to cause one or more processors to train a machine learning system comprising a machine-learning, main task-performance network to perform a main machine-learning task, wherein the main task-performance network comprises a deep neural network that comprises:

an input portion comprising an input layer and N hidden layers, where N≥0;

an output portion comprising an output layer and M hidden layers, where M≥0; and a modulation layer between the input portion and the output portion, wherein the modulation layer comprises:

a plurality of nodes; and connects the input portion to the output portion, wherein the processor executable instructions are configured to cause one or more processors to:

train, through machine-learning, an auxiliary network to perform an auxiliary machine learning task;

after training the auxiliary network, extract features by the auxiliary network from input features; and after extracting the features with the auxiliary network, train the main task-performance network, and modulate nodes of the modulation layer of the main task-performance network with a modulation code that is based on the extracted features from the auxiliary network;

wherein:

the ML auxiliary network is configured to provide modulation codes to the modulation layer, the modulation codes comprise coefficients based on features extracted by the ML auxiliary network;

each of the nodes of the modulation layer multiplies an output from a node of the input portion of the main task-performance network by one of the coefficients of the modulation codes; and the product of the multiplication being input to a node of the output portion of the main task-performance network.

16. The non-transitory computer-readable medium of claim 15, wherein:

the modulation layer comprises P nodes, where P>1;

wherein the modulation codes comprise P coefficients that are based on the features extracted by the auxiliary network; and each of the P nodes of the modulation layer, during training of the main classification network, multiplies an output from a node of the input portion of the main task-performance network by one of the P coefficients of the modulation codes from the auxiliary network, with a product of the multiplication being input to a node of the output portion of the main task-performance network.

17. The non-transitory computer-readable medium of claim 16, wherein the processor executable instructions are further configured to cause one or more processors to generate, by a machine-learning converter network connected between the auxiliary network and the modulation layer of the main task-performance network, the modulation code from the features extracted by the auxiliary network.

18. The non-transitory computer-readable medium of claim 17, wherein:

the main machine-learning task comprises language-independent speech recognition; and the auxiliary machine-learning task of the auxiliary network comprises language identification.

19. The non-transitory computer-readable medium of claim 18, wherein the machine learning system further comprises a plurality of unique, machine-learning, mono-lingual sub-networks, wherein outputs of the mono-lingual sub-networks are connected to the input portion of the main task performance network.

20. The non-transitory computer-readable medium of claim 19, wherein each of the plurality of unique monolingual sub-networks receive as input the features extracted by the auxiliary network.

\* \* \* \* \*